Oct. 3, 1967    J. K. PETERS ET AL    3,344,549
FISHING LURES AND HOOK HARNESSES THEREFOR
Filed July 1, 1965
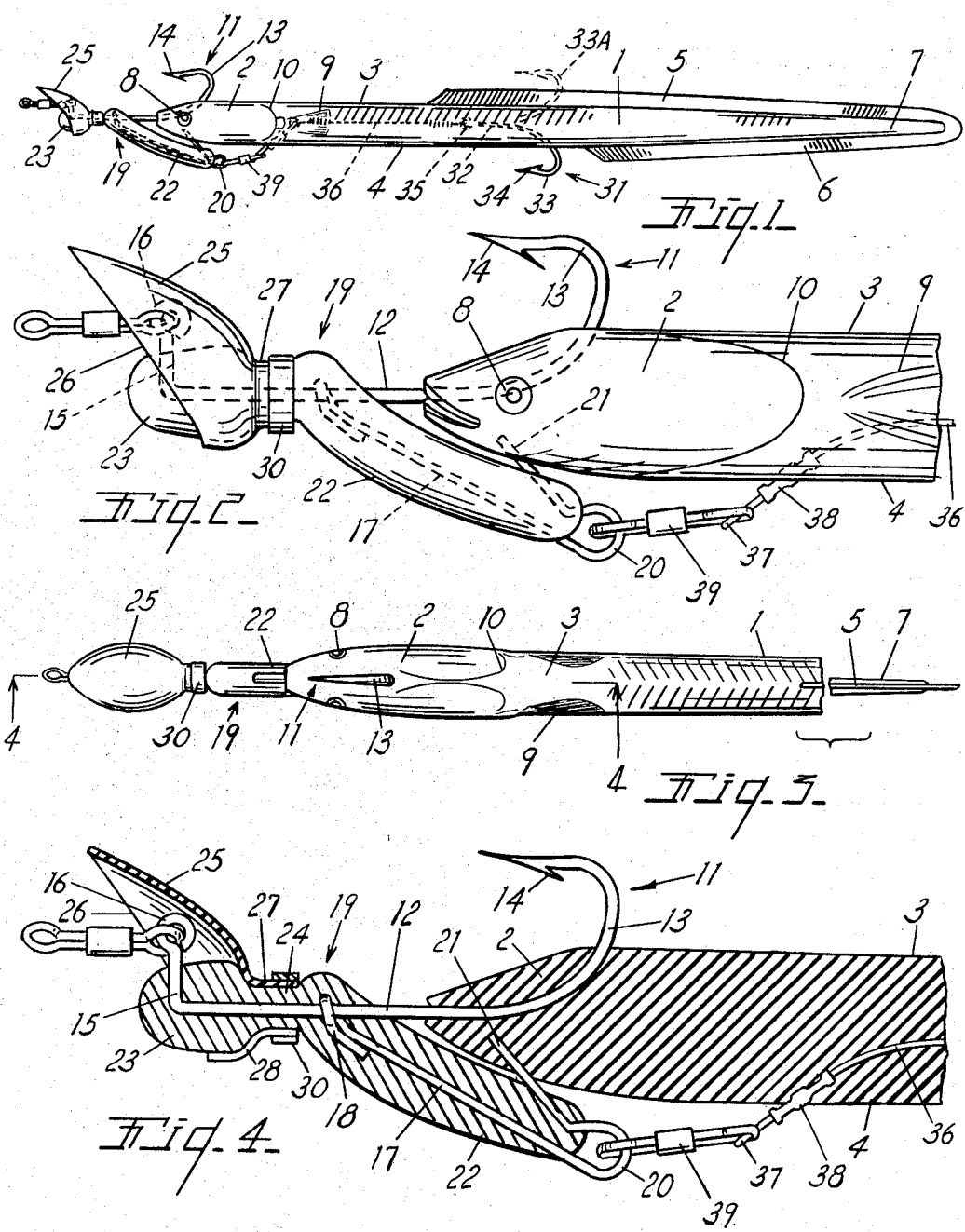
INVENTORS
John K. Peters
Bingham A. McClellan ized Patent Office 3,344,549
Patented Oct. 3, 1967

3,344,549
FISHING LURES AND HOOK HARNESSES
THEREFOR
John K. Peters and Bingham A. McClellan, Traverse City, Mich., assignors to Burke Flexo-Products Company, Traverse City, Mich.
Filed July 1, 1965, Ser. No. 468,896
8 Claims. (Cl. 43—42.11)

This invention relates to fishing lures and hook harnesses therefor. The principal objects of this invention are:

First, to provide an elongated flexible eel-like fish lure with a line attaching and hook harness that will provide hooks projecting from the forward and mid-sections of the body and connect the hooks to a line by a high tensile strength connection while providing keel-like weight that keeps the body upright and water deflecting scoop or baffle means that give the body a natural lateral flexing action while being drawn through or permitted to sink in the water.

Second, to provide a line connecting, hook harness that is easily attachable to artificial or natural eel-like lures or baits.

Third, to provide a fish lure and hook harness which is relatively inexpensive to manufacture and which provides for freely flexible but high tensile strength connections between longitudinally spaced hooks and a lure orienting keel-like weight.

Fourth, to provide an inexpensive hook harness for artificial fishing lures in which a lure orienting weight locates one hook relative to a high tensile strength connection to another hook, and in which a part of the high tensile connection is engageable with the body of the lure to locate the weight relative to the body.

Other objects and advantages of the invention will be apparent from a consideration of the following description and claims. The drawings, of which there is one sheet, illustrate a highly practical form of the lure and harness of the invention.

FIG. 1 is a side elevational view of the lure with its hook harness in operative position.

FIG. 2 is an enlarged fragmentary side elevational view of the front or head end of the lure.

FIG. 3 is a fragmentary top plan view of the lure with a portion of the rear part of the body broken away.

FIG. 4 is an enlarged, fragmentary, vertical longitudinal cross sectional view taken along the plane of the line 4—4 in FIG. 3.

The body 1 of the lure in the example illustrated is shaped like an eel having a head 2, top 3 and bottom 4. A top fin 5 and bottom fin 6 are connected around the tail 7 as in a natural eel. The body can be, and desirably is, molded of a synthetic plastic material having elastomeric and resilient properties. A polyurethane material is satisfactory for molding the body, and the body may be given natural surface markings, shape and color by provision of simulated eyes 8, side fins 9 and gills 10.

The hook and line attaching harness of the lure consists first of a front hook generally indicated at 11 and having a straight shank 12 with an upwardly and forwardly curved hook end 13 and barb 14. The front end of the shank 12 has an upturned end portion 15 terminating in a line attaching eye 16. Attached to the shank 12 is a downwardly and rearwardly extending wire 17 of bendable but relatively rigid wire of high tensile strength relative to the material of the body. The wire 17 is engaged with the shank 12 by bending a loop 18 in the wire around the shank. The depending wire 17 is fixed and secured in the same general plane of the hook 11 by a mass of relatively heavy material such as lead generally indicated at 19 and in which the upper end of the wire 17, the loop 18 and the forward portion of the shank are embedded.

The lower rear end of the wire 17 is formed into an upwardly and forwardly turned loop 20 with an upwardly projecting prong 21 on its end. A downwardly and rearwardly inclined portion 22 of the weight mass 19 surrounds the wire 17 to just forwardly of the lower loop 20 and closes the loop but the prong 21 projects upwardly and forwardly thereof. An enlarged ball-like portion 23 of the weight mass surrounds the upturned bend 15 of the hook shank, below the eye 16, and is connected to the top of the inclined portion of the mass by a generally cylindrical neck portion 24. The integral nature of the weight mass, which can be poured or molded around the shank 12 and wire 17 holds the hook 13, eye 16, loop 20 and prong 21 in the same general plane.

Fitted around and over the ball-like portion 23 is a lure activating scoop or baffle 25 of transparent plastic. The scoop is rounded and forwardly concave with a downwardly and rearwardly inclined front edge 26 merging into a generally cylindrical part 27 that fits around the neck 24 of the weight mass. The cylindrical part 27 and the lower side of the scoop 25 are longitudinally slotted as at 28 (see FIG. 4) so that the scoop may be snapped over the weight mass. A clamp ring 30 secures the scoop in place.

Located rearwardly, near the middle of the body 1, is a second hook generally indicated at 31. This hook has a shank 32 embedded in the body and a downwardly and forwardly turned hook 33 and barb 34. Alternatively, the hook may project upwardly through the top of the body as indicated by the dotted lines at 33A in FIG. 1. The forward end of the shank 32 has the usual eye 35 which is connected to a relatively laterally flexible but high tensile strength strand 36 of leader material such as stranded or single metal wire. The strand 36 extends forwardly through the body and then downwardly and out through the bottom 4 of the body 1 in adjacent but rearwardly spaced relation to the loop 20. A loop 37 is formed in the end of the strand as by turning the end and securing it to itself by a crimped clamp sleeve 38. The loop 37 and the loop 20 are releasably connected by a slide link connector 39 of well known construction.

In assembling the harness on the body of the lure, a large needle-like probe having a sharp point and a hook engageable with the loop 37 may be used to thread the strand 36 through the body, cutting its own passage as it progresses or following a pre-molded passage in the body 1. The barbed point 14 of the front hook 11 may be forced rearwardly through the central portion of the head 2, and the hook then rotated forwardly and downwardly to the forwardly projecting position illustrated. By pushing the shank 12 rearwardly, and then pulling it forwardly while holding up the rear end of the keel weight mass 22, the prong 21 may be forced into the underside of the head. The connection of the slide connector 39 is obvious.

In use, the lure has a very natural and active movement in the water. The keel weight 22 keeps the body upright at all times. When the line attached to the eye 16 is slack the mass or weight 19 causes the head of the lure to sink first with the scoop or actionizer partially slowing the movement and imparting irregular force to the head of the lure as the reaction of the scoop in passing through the water varies with speed. This causes the tail and rear portions of the body of the lure to have a lateral, swimming-like action. The flexible strand 36 yields readily to flexing of the body. When the line is pulled taut, the lure moves up or ahead with a similar laterally flexing, swimming motion.

The harness can also be applied, if desired, to a natural fish bait and have the same actionizing effect. In either case, whether the body 1 is synthetic or natural, the pull of a fish that becomes engaged with either hook is well and adequately resisted and transmitted to the line, either directly from the front hook 11 or the rear hook 31 through the strand 36 and wire 17.

The harness as illustrated is particularly effective and useful on longer eel-like bodies of the order of twelve or more inches in length. For shorter bait bodies, it is practical to omit the neck 24 and ball-like portion 23 of the weight mass 19, along with the actionizing scoop 25 and its retaining band 30. In such case the hooks 11 and 31 would normally be smaller and the strand 36 appropriately shorter.

What is claimed as new is:

1. A fishing lure comprising,
an elongated body of molded elastomeric and resilient rubber-like consistency having the shape of a natural aquatic creature with top and bottom and head,
thin integral fin means projecting from said body and denoting the top and bottom thereof,
a front hook having a straight shank portion projecting from the front of said body and centrally thereof,
a curved portion of said hook extending upwardly through the top of the head of said body and forwardly thereabove to a barbed point,
an upwardly turned end at the forward end of said shank having a line attaching eye,
a depending relatively rigid wire having a first loop at its forward end engaged around said shank forwardly of said head and extending downwardly and rearwardly to a second loop located below said head,
an integral retaining prong on the upper end of said second loop penetrating into the bottom of the head of said body in an upwardly and forwardly directed position,
a mass of heavy lead-like material molded around said shank portion of said hook and the first loop on said depending wire with a portion of the mass extending forwardly in an enlarged ball-like weight surrounding the upturned end of said shank below said line attaching eye and with another portion of the mass extending downwardly and rearwardly around said depending wire to below the head of said body and forwardly of said second loop at the bottom of said wire,
a second hook having a straight shank portion embedded in a central portion of said body and a forwardly curved portion with a forwardly facing barbed end projecting from said body,
an eye on the forward end of the shank of said second hook,
a flexible strand of high tensile strength material connected to said eye on said second hook and extending forwardly within said body and then downward through the bottom of the body and having a third loop located adjacent but in rearwardly spaced relation to said second loop at the bottom of said depending wire,
releasable means connecting said third loop on said strand with said second loop on the bottom of said depending wire,
and a rounded forwardly opening scoop of transparent material with a downwardly and rearwardly inclined open front side disposed in overlapping relation to the line attaching eye on said first hook and the ball-like portion of said mass of material,
said scoop having a split neck at its rear end clamped around said mass between said ball-like and depending portions of said mass.

2. A fishing lure comprising,
an elongated body of molded elastomeric and resilient rubber-like consistency having the shape of a natural aquatic creature with top and bottom and head,
thin integral fin means projecting from said body and denoting the top and bottom thereof,
a front hook having a shank portion projecting from the front of said body and centrally thereof,
a curved portion of said hook extending upwardly through the top of the head of said body and forwardly thereabove to a point,
an upwardly turned end at the forward end of said shank having a line attaching eye,
a depending relatively rigid wire having a first loop at its forward end engaged around said shank forwardly of said head and extending downwardly and rearwardly to a second loop located below said head,
an integral retaining prong on the upper end of said second loop penetrating into the bottom of the head of said body in an upwardly and forwardly directed position,
a mass of heavy material molded around said shank portion of said hook and the first loop on said depending wire with a portion of the mass extending downwardly and rearwardly around said depending wire to below the head of said body and forwardly of said loop at the bottom of said wire,
a second hook having a shank portion embedded in a central portion of said body and a forwardly curved portion with a forwardly facing end projecting from said body,
a flexible strand of high tensile strength material connected to said second hook and extending forwardly within said body and then downward through the bottom of the body and having a third loop located adjacent but in rearwardly spaced relation to said second loop at the bottom of said depending wire,
releasable means connecting said third loop on said strand with said second loop on the bottom of said depending wire.

3. A harness for a fishing lure having an elongated body of material and having a top and bottom and head comprising,
a front hook having a straight shank portion adapted to project from the front of said body,
a curved portion of said hook extending upwardly to a barbed point,
an upwardly turned end at the forward end of said shank having a line attaching eye,
a depending relatively rigid wire having a loop at its forward end engaged around said shank forwardly of said point and extending downwardly and rearwardly to an upwardly and forwardly turned loop located below said point,
an integral retaining prong on the upper end of said upwardly turned loop adapted to penetrate into the bottom of the head of said body in an upwardly and forwardly directed position,
a mass of heavy lead-like material molded around said shank portion of said hook and the loop on said depending wire with a portion of the mass extending forwardly in an enlarged ball-like weight surrounding the upturned end of said shank below said line attaching eye and with another portion of the mass extending downwardly and rearwardly around said depending wire to below the curved portion of said hook and forwardly of said loop at the bottom of said wire,
a second hook having a straight shank portion adapted to be embedded in a central portion of said body and a downwardly and forwardly curved portion with a forwardly facing barbed end,
an eye on the forward end of the shank of said second hook,
a flexible strand of high tensile strength metal leader material connected to said eye on said second hook,
means forming a loop in the forward end of said strand,
releasable slide link connector means connecting said loop on said strand with said loop on the bottom of said depending wire, and a rounded forwardly opening scoop of transparent material with a downwardly and rearwardly inclined open front side disposed in overlapping relation to the line attaching eye on said first hook and the ball-like portion of said mass of material, said scoop having a split neck at its rear end clamped around said mass between said ball-like and depending portions of said mass.

4. A harness for a fishing lure having an elongated body of material and having a top and bottom and head comprising, a front hook having a straight shank portion adapted to project from the front of said body, a curved portion of said hook extending upwardly to a point, an upwardly turned end at the forward end of said shank having a line attaching eye, a depending relatively rigid wire having a loop at its forward end engaged around said shank forwardly of said point and extending downwardly and rearwardly to an upwardly and forwardly turned loop located below said point, an integral retaining prong on the upper end of said upwardly turned loop adapted to penetrate into the bottom of the head of said body in an upwardly directed position, a mass of heavy material molded around said shank portion of said hook and the loop on said depending wire with a portion of the mass extending forwardly in an enlarged ball-like portion surrounding the upturned end of said shank and with another portion extending downwardly and rearwardly around said depending wire to below the curved portion of said hook and forwardly of said loop at the bottom of said wire, a second hook having a shank portion adapted to be embedded in a central portion of said body and a forwardly curved portion with a forwardly facing end, a flexible strand of leader material connected to said second hook, means forming a loop in the forward end of said strand, releasable means connecting said loop on said strand with said loop on the bottom of said depending wire, and a rounded forwardly opening scoop with a downwardly and rearwardly inclined open front side disposed in overlapping relation to the line attaching eye on said first hook and the ball-like portion of said mass of material, said scoop having its rear end secured to said mass.

5. A harness for a fishing lure having an elongated body of resilient consistency with a top, bottom and head comprising, a front hook having a straight shank portion adapted to project from the front of said body, a curved portion of said hook extending upwardly and forwardly above said shank to a barbed point, an upwardly turned end at the forward end of said shank having a line attaching eye, a depending relatively rigid wire having a loop at its forward end engaged around said shank forwardly of said curved hook and extending downwardly and rearwardly to an upwardly and forwardly turned loop located below said curved hook, an integral retaining prong on the upper end of said upwardly turned loop, a mass of heavy lead-like material secured around said shank portion of said hook and the loop on said depending wire with a portion of the mass extending downwardly and rearwardly around said depending wire to below the curved portion of said hook and forwardly of said loop at the bottom of said wire, a second hook having a straight shank portion adapted to be embedded in a central portion of said body and a downwardly and forwardly curved portion with a forwardly facing barbed end, an eye on the forward end of the shank of said second hook, a flexible strand of high tensile strength material connected to said eye on said second hook and adapted to extend forwardly within said body, means forming a loop in the forward end of said strand, and releasable means connecting said loop on said strand with said loop on the bottom of said depending wire.

6. A fishing lure comprising, an elongated body of flexibly resilient material, a front hook having a portion of its shank embedded in the front portion of said body member with a portion of the shank projecting forwardly therefrom and with the prong of the hook projecting upwardly from the body member adjacent the front end thereof, a weight member disposed with a portion thereof projecting forwardly from the front of the body member and supportedly engaged with the shank of said hook, a coupling member for said weight member having a portion of substantial length embedded in said weight member and having an embedded eye at its forward end engaged with the shank of the hook in forwardly spaced relation to the front end of the body member and having a looped portion at its rear end projecting from the rear end of the weight member and having an upwardly and forwardly projecting portion partially embedded in the weight member and projecting therefrom into embedding engagement with said body member, a second hook the shank of which is supportedly mounted in said body member with a prong thereof projecting from the body member, a flexible coupling means connecting the shank of said second hook with the said coupling member for said weight member.

7. A harness for a fishing lure having an elongated body of resiliently flexible material, comprising a front hook having a portion of its shank adapted to be embedded in said body to project forwardly therefrom with a point of the hook extending upwardly from and in forwardly projecting relation to said body, said shank having a line attaching eye on its projecting end, a depending relatively rigid coupling member having its forward end engaged with said shank of said hook and extending downwardly and rearwardly and terminating in a loop located below said shank and adapted to be supportedly engaged with said body member, a weight member mounted on said coupling member with a portion thereof adapted to extend downwardly and rearwardly below the front end of said body, a second hook having a shank portion adapted to be embedded in a central portion of said body member with its prong projecting from and forwardly relative to said body member, a flexible coupling strand connected to the shank of said second hook and adapted to extend forwardly within the body with a portion projecting below the body, and means connecting said strand with the rear end of said coupling member.

8. A fishing lure comprising, an elongated body of flexibly resilient material, a front hook having a portion of its shank embedded in the front portion of said body member with a portion of the shank projecting forwardly therefrom and with the prong of the hook projecting transversely and forwardly from the body member adjacent the front end thereof, a weight member disposed with a portion thereof projecting forwardly from the front of the body member and supportedly engaged with the shank of said hook, a coupling member for said weight member having a portion of substantial length embedded in said weight member and having an embedded eye at its forward end engaged with the shank of the hook in forwardly spaced relation to the front end of the body member and having a looped portion at its rear end projecting from the rear end of the weight member and having an upwardly and forwardly projecting portion projecting into embedding engagement with said body member, a second hook the shank of which is supportedly mounted in said body member with the prong thereof projecting from the body member, a flexible coupling means connecting the shank of said second hook with the said coupling member for said weight member.

References Cited

UNITED STATES PATENTS

| 2,927,392 | 3/1960 | Lievense et al. | 43—42.39 |
| 2,955,378 | 10/1960 | Burke | 43—42.28 |

SAMUEL KOREN, *Primary Examiner.*

D. J. LEACH, *Assistant Examiner.*